US012024414B2

(12) United States Patent
Strauss et al.

(10) Patent No.: US 12,024,414 B2
(45) Date of Patent: Jul. 2, 2024

(54) CAPPING DEVICE AND METHOD FOR CLOSING SCREW CAPS

(71) Applicant: KRONES AG, Neutraubling (DE)

(72) Inventors: Johannes Strauss, Wolfsegg (DE); Maximilian Landstorfer, Pentling (DE)

(73) Assignee: KRONES AG, Neutraubling (DE)

( * ) Notice: Subject to any disclaimer, the term of this patent is extended or adjusted under 35 U.S.C. 154(b) by 125 days.

(21) Appl. No.: 17/017,563

(22) Filed: Sep. 10, 2020

(65) Prior Publication Data

US 2021/0087037 A1 Mar. 25, 2021

(30) Foreign Application Priority Data

Sep. 20, 2019 (DE) ..................... 10 2019 125 330.6

(51) Int. Cl.
*B67B 3/26* (2006.01)
*B67B 3/20* (2006.01)

(52) U.S. Cl.
CPC ............ *B67B 3/261* (2013.01); *B67B 3/2093* (2013.01); *B67B 3/208* (2013.01)

(58) Field of Classification Search
CPC ......... B67B 3/261; B67B 3/2093; B67B 3/10; B67B 3/20; B67B 3/2066; B67B 3/2073; B67B 3/208
See application file for complete search history.

(56) References Cited

U.S. PATENT DOCUMENTS

2009/0293437 A1* 12/2009 Schulz .................. B67B 3/2093
53/331.5

FOREIGN PATENT DOCUMENTS

| | | | |
|---|---|---|---|
| CN | 102421678 | A | 4/2012 |
| DE | 10245879 | A1 | 4/2004 |
| DE | 102006025811 | A1 | 12/2007 |
| EP | 0571980 | A2 | 12/1993 |
| EP | 1249426 | A1 | 10/2002 |
| GB | 2259507 | A | 3/1993 |
| JP | 2001247191 | A | 9/2001 |
| JP | 2005193937 | A | 7/2005 |

OTHER PUBLICATIONS

Japanese Patent Office, Office Action Issued in Application No. 2020-149628, Oct. 5, 2021, 4 pages.
China National Intellectual Property Administration, Office Action and Search Report Issued in Application No. 202010978831.1, Dec. 29, 2021, 38 pages. (Submitted with Partial Translation).

* cited by examiner

*Primary Examiner* — Joshua G Kotis
(74) *Attorney, Agent, or Firm* — McCoy Russell LLP

(57) ABSTRACT

The present invention relates to a capping device for closing screw caps, comprising a motor and a power train so as to transmit force from the motor to the screw caps by means of the power train. The capping device comprises a control unit configured for dynamically adapting the operation of the motor, making use of a measured actual value of an operating parameter of the motor, a target closing torque and an actual closing torque model.

11 Claims, 2 Drawing Sheets

CAPPING DEVICE AND METHOD FOR CLOSING SCREW CAPS

CROSS REFERENCE TO RELATED APPLICATION

The present application claims priority to German Patent Application No. 10 2019 125 330.6 filed on Sep. 20, 2019. The entire contents of the above-listed application is hereby incorporated by reference for all purposes.

TECHNICAL FIELD

The present invention lies in the technical field of devices, which automatically close screw caps of containers, e.g. in a motor-driven manner. It relates in particular to a capping device for closing screw caps, comprising a motor and a power train and configured to transmit, by means of the power train, force from the motor to the screw caps.

BACKGROUND AND SUMMARY

It is known to close screw caps by means of a motor by suitably transmitting the motor force so that the screw cap will be turned onto a thread, e.g. a thread on a container opening. In so doing, a maximum motor torque is specified, by way of example. This variable can easily be detected with existing systems and the motor can be controlled such that the maximum motor torque will not be exceeded. The motor torque is here the torque outputted by the motor. When transmitted to the cap, this motor torque is divided at least into the intrinsic torque of the power train and the torque acting on the screw cap. How tightly a screw cap is closed after having been closed can be quantified, e.g. through the actual closing torque. The actual closing torque depends on the torque acting on the screw cap during the closing process. In addition, also the properties of the screw cap and of its counterpart, in particular the respective thread, are of importance in the closing process. In order to determine their influence on the actual closing torque, they can be quantified in the form of a counter-torque. For example, the coefficients of friction of the cap and of its counterpart, the geometry of the threads or the elasticity of the respective material may here influence the magnitude of the counter-torque. The actual closing torque depends not only on the torque acting on the screw cap but also on this counter-torque.

In principle, it is desirable that the actual closing torque deviates as little as possible from a predetermined target closing torque. The known systems, however, lead to a comparatively wide spread of actual closing torques.

The object underlying the present invention is therefore the provision of a capping device and of a method for closing screw caps, in the case of which the average deviation of the actual closing torque from the target closing torque is reduced.

This object is achieved by the subject matters of the independent claims. Preferred embodiments are described in the dependent claims.

The capping device referred to at the beginning comprises, according to the present invention, a control unit configured for dynamically adapting the operation of the motor, making use of a measured actual value of an operating parameter of the motor, e.g. an actual speed of the motor, a target closing torque and an actual closing torque model.

Measuring the actual closing torque during operation is technically difficult. The inventors have also found that a significant contribution to the deviations results from the inertia and the friction, which occur in the power train and which may lead to a certain amount of overrun, among other things. Even if the actual closing torque were measured during operation and if the motor were stopped when the target closing torque is reached, the closing torque would, due to overrun of the power train, still increase by an amount that depends on various system parameters and/or operating parameters. It follows that a correction with a simple offset will not always lead to the desired improvement. In addition, also deviations of the properties of the cap and/or of the counterpart of the cap, e.g. deviations originating from the respective material used, play a role, since the development with time of the counter-torque caused thereby varies, due to such deviations, from one cap process to the next, in particular the respective development towards the end of a closing process.

The claimed dynamic adaptation, however, allows a reliable reduction of the deviation of the actual closing torque from the target closing torque.

Target closing torque means here a predetermined value which the actual closing torque should have after completion of the closing process. The target closing torque may be stored at an arbitrary location, e.g. on a storage medium of the capping device and on a separate storage medium. It may have been stored by a user. How high the target closing torque is and in what form or units it is specified depends on the actual case of use and may be selected by the person skilled in the art in a suitable manner.

In addition to the motor and the power train, the capping unit may also comprise an element that interacts directly with the cap, e.g. a screwing head configured for holding the cap and/or for directly transmitting force during the closing process. The motor may e.g. be an electric motor. The power train may include a gear unit, by way of example.

The screw caps may comprise caps, e.g. lids, for containers, the caps being provided with a thread, in particular an internal thread.

Dynamic adaptation means here executing control, e.g. by means of a closed loop control process, which has the actual values of the operating parameters of the motor supplied thereto and which adjusts the set values of the operating parameters of the motor during the entire closing process such that a predetermined target closing torque will be accomplished. In particular, the capping device may be configured such that the measurement and the adaptation of the operation of the motor, in particular a calculation of the actual closing torque by means of the actual closing torque model, take place continuously.

In particular, a continuous calculation of the intrinsic torque of the power train and, derived therefrom, of the actual closing torque can be executed and, based on this calculation, the values of the operating parameters can be adjusted. In the simplest case, the actual closing torque model can generate a value for the actual closing torque by forming the difference between the motor torque (torque outputted by the motor) and the intrinsic torque of the power train.

The actual closing torque model may be configured such that, based on a modelled torque acting on the cap, it will provide a modelled actual closing torque resulting from this modelled torque.

The torque acting on the cap may here result from the motor torque, the intrinsic torque of the power train and, possibly, also from other system parameters, such as friction, and is the torque that is transmitted to the cap. The closing torque depends on the torque acting on the cap as well as on the counter-torque. The counter-torque may, for example, depend on the properties of the cap and/or of its counterpart, in particular their threads, as explained above. It follows that these properties and parameters may influence the modelled torque acting on the cap and the modelled closing torque.

The actual closing torque model may be configured such that, making use of a power train model, it provides the torque acting on the cap, the power train model comprising in particular a modelled intrinsic torque of the power train.

The power train model may be configured such that it provides a value of the intrinsic torque of the power train, based on the inertia and/or the friction in the power train.

The control unit may be configured for dynamically adapting the operation of the motor on the basis of a control loop.

The control loop may be configured for outputting, for at least one operating parameter to be set, a value and/or a range of values and/or an upper and/or lower limit for the value, based on the measured actual value of the operating parameter and a predetermined target closing torque as input variables.

The control loop may be configured to determine a current value of the actual closing torque making use of the actual closing torque model, and to determine, based on the current value of the actual closing torque and on the target closing torque, the value and/or the range of values and/or the upper and/or lower limit for the value of the at least one operating parameter to be set, in particular based on a comparison between the value of the actual closing torque and the value of the target closing torque.

The control loop may be configured to determine the value and/or the range of values and/or the upper and/or lower limit for the value of the operating parameter to be set, in such a way that, according to the actual closing torque model, an approach of the value of the actual closing torque to the target closing torque can be expected, when setting the value of the operating parameter to be set.

The control unit may be configured to set at the motor an operating parameter value, which corresponds to the outputted value and/or lies within the outputted range of values and/or is below the outputted upper limit and/or is above the outputted lower limit.

The operating parameter to be set may comprise a motor speed and/or a motor torque.

The capping device may be configured for determining a value of a counter-torque, in particular the above-described counter-torque, which is caused e.g. by the screw cap, by means of the actual closing torque model and by making use of a, or of the set value of the operating parameter, of an expected actual value of the operating parameter and of the measured value of the operating parameter.

The present invention also relates to a capper comprising at least one of the above-described capping devices. The capper may in particular be configured for continuous operation. The capper, in particular the capper configured for continuous operation, may be configured in the form of a machine comprising a plurality of the above-described capping devices. The machine may in particular be configured in the form of a rotary machine and comprise a plurality of capping devices according to the present invention. The capping devices may in this case be arranged in particular on the outer circumference of a carousel of the rotary machine, which is configured to convey the containers to be closed. In particular, the capping devices may be arranged at regular intervals on the outer circumference of the carousel.

The provision of a plurality of capping devices is advantageous for an increased throughput. In particular for arrangements comprising a plurality of capping devices, especially in rotary machines, due to this high throughput, it is particularly advantageous to carry out the closing process making use of a motor, as fast as possible but nevertheless precisely, so that the use of the above-described capping device will allow a high throughput in combination with high quality, especially in such machines.

The invention also relates to a filling plant, in particular for the filling of foodstuff, which comprises one or a plurality of the above-described capping devices, in particular at least one of the above-described cappers, in particular at least one of the above-described rotary machines.

The present invention also relates to a method for closing screw caps, wherein force is transmitted from a motor to the screw caps by means of a power train for the purpose of closing. Operation of the motor is dynamically adapted making use of a measured actual value of an operating parameter of the motor, e.g. an actual speed, a target closing torque as well as an actual closing torque model.

The method steps may be executed as a closed-loop control method, i.e. the steps may be carried out repeatedly and the values of the operating parameters may be adapted dynamically. The measurement of the actual value of the operating parameter and the adaptation of the operation of the motor may in particular be carried out continuously.

Motor operation may be adapted dynamically, in particular on the basis of a control loop. In particular, the control loop may be configured for outputting, based on the measured actual value of the operating parameter and on a predetermined target closing torque as input variables, at least for one motor operating parameter to be set, a value and/or a range of values and/or an upper and/or lower limit for the value.

The control loop may be configured for determining a current value of the actual closing torque making use of the actual closing torque model, and for determining, based on the current value of the actual closing torque and on the target closing torque, the value and/or the range of values and/or the upper and/or lower limit for the value of the at least one operating parameter to be set, in particular based on a comparison between the value of the actual closing torque and the target closing torque.

The control loop may in particular be configured for determining the value and/or the range of values and/or the upper and/or lower limit for the value of the operating parameter to be set, in such a way that, according to the actual closing torque model, an approach of the value of the actual closing torque to the target closing torque can be expected, when setting the value of the operating parameter to be set.

The method may comprise setting at the motor, by means of a control unit, an operating parameter value, which corresponds to the outputted value and/or lies within the outputted range of values and/or is below the outputted upper limit and/or is above the outputted lower limit.

The features and advantages described in connection with the device are also applicable to the method in an analogous manner.

Additional features and advantages will be explained hereinafter making reference to the exemplary figures, in which:

DETAILED DESCRIPTION

Figure 1:
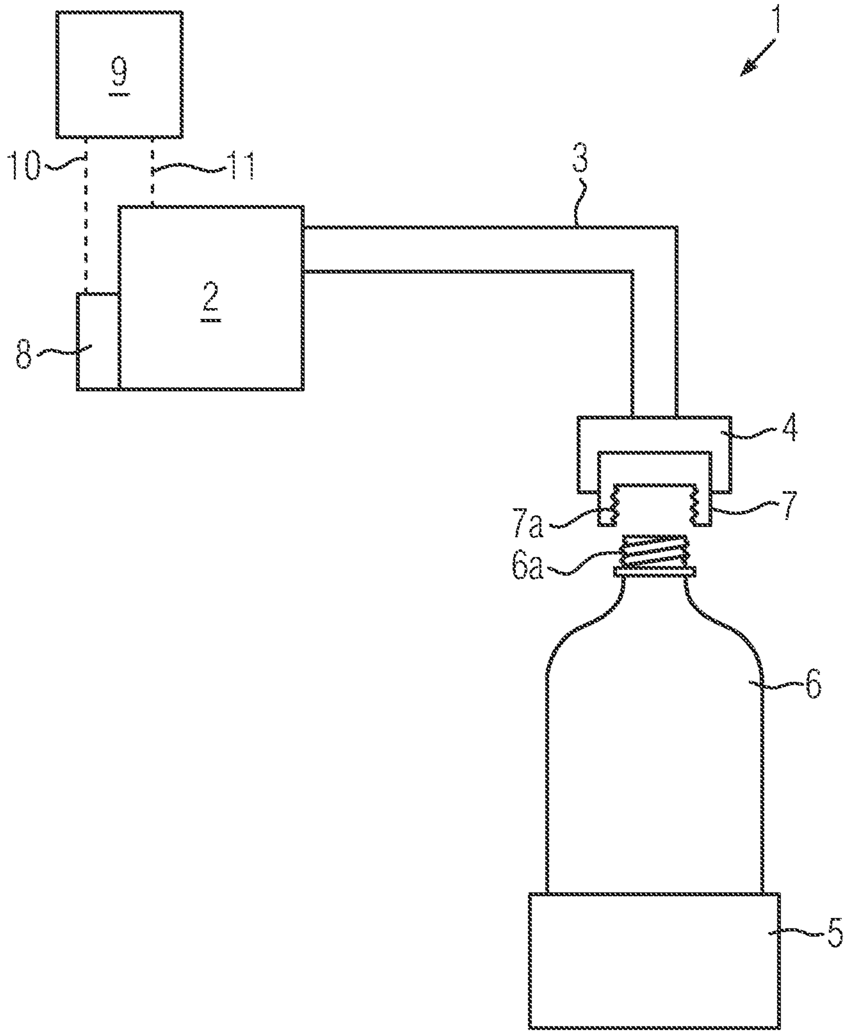
FIG. 1 shows a schematic representation of a capping device according to an embodiment, which is not true to scale.

In FIG. 1 a capping device 1 of an embodiment of the present invention is shown schematically and not true to scale. The capping device comprises a motor 2, a power train 3 and a screwing head 4.

In addition, the figure shows a support 5, which may or may not be part of the capping device and which is configured for supporting a container 6, in particular for supporting the container in the operating area of the screwing head.

Furthermore, a screw cap 7 held by the screwing head is shown. The screw cap has a thread 7*a*, which is here an internal thread. In order to illustrate the thread, a cross-section through the screw cap is shown here. The container has at the end to be closed a thread 6*a*, which is here exemplarily an external thread that matches the thread of the screw cap. It goes without saying that the capping device is not limited to closing exactly this type of containers and caps.

The figure also shows a sensor 8, which may be attached to the motor or formed integrally with the motor. The sensor is configured for measuring actual values of at least one operating parameter of the motor, e.g. for detecting the motor speed and/or the motor torque.

Furthermore, a control unit 9 is shown, which is connected to the sensor via a data link 10, the sensor and the control unit being configured in such a way that data detected by the sensor are transmitted to the control unit. Alternatively, the control unit and the sensor may be formed integrally with each other.

The control unit is configured for setting the respective value of one or of a plurality of operating parameters of the motor. To this end, the control unit may have a data link 11 to the motor. Alternatively, the control unit may be formed integrally with the motor.

In the following, a method for closing screw caps will be described, which can be carried out in particular with the above-described capping device.

In particular, for closing a screw cap, the screw cap may be screwed onto the container thread of a container. In so doing, the container may e.g. be supported by a support and the screw cap may be held by a screwing head. The motor may be operated e.g. controlled by a control unit, and the motor force may be transmitted to the screw cap through a power train, in particular via the screwing head. The transfer of the motor force may include a transmission and/or a deflection of the motor force.

The operation of the motor is dynamically adapted making use of a measured actual value of an operating parameter of the motor, e.g. an actual speed, a target closing torque, and an actual closing torque model. A control loop may be used for this purpose, e.g. the control loop described hereinafter in detail in connection with FIG. 2.

For example, based on the measured actual value of the operating parameter and a predetermined target closing torque as input variables, the actual closing torque model can be used for determining and outputting, for at least one motor operating parameter to be set, a value and/or a range of values and/or an upper and/or lower limit for the value.

For example, a motor speed to be set and/or a motor torque to be set and/or a maximum value for the motor torque, to which the motor torque is limited, i.e. an upper limit for the motor torque, can be determined and outputted.

The method may comprise determining, making use of the actual closing torque model, a current actual closing torque and, based on the current actual closing torque and the target closing torque, determining the value and/or the range of values and/or the upper and/or lower limit for the at least one operating parameter to be set. To this end, the actual closing torque may e.g. be compared with, in particular subtracted from, the target closing torque.

The value and/or the range of values and/or the upper and/or lower limit for the value of the operating parameter to be set can be determined in such a way that, according to the actual closing torque model, an approach of the value of the actual closing torque to the target closing torque can be expected, when setting the value of the operating parameter to be set.

The value set for the operating parameter at the motor will then be a value, which corresponds to the outputted value and/or lies within the outputted range of values and/or is below the outputted upper limit and/or is above the outputted lower limit.

The above-described method steps are carried out as a closed-loop control process, i.e. the steps are repeatedly carried out and the values of the operating parameter are dynamically adapted. Measurement, determination and output may, in particular, be performed continuously.

Figure 2:
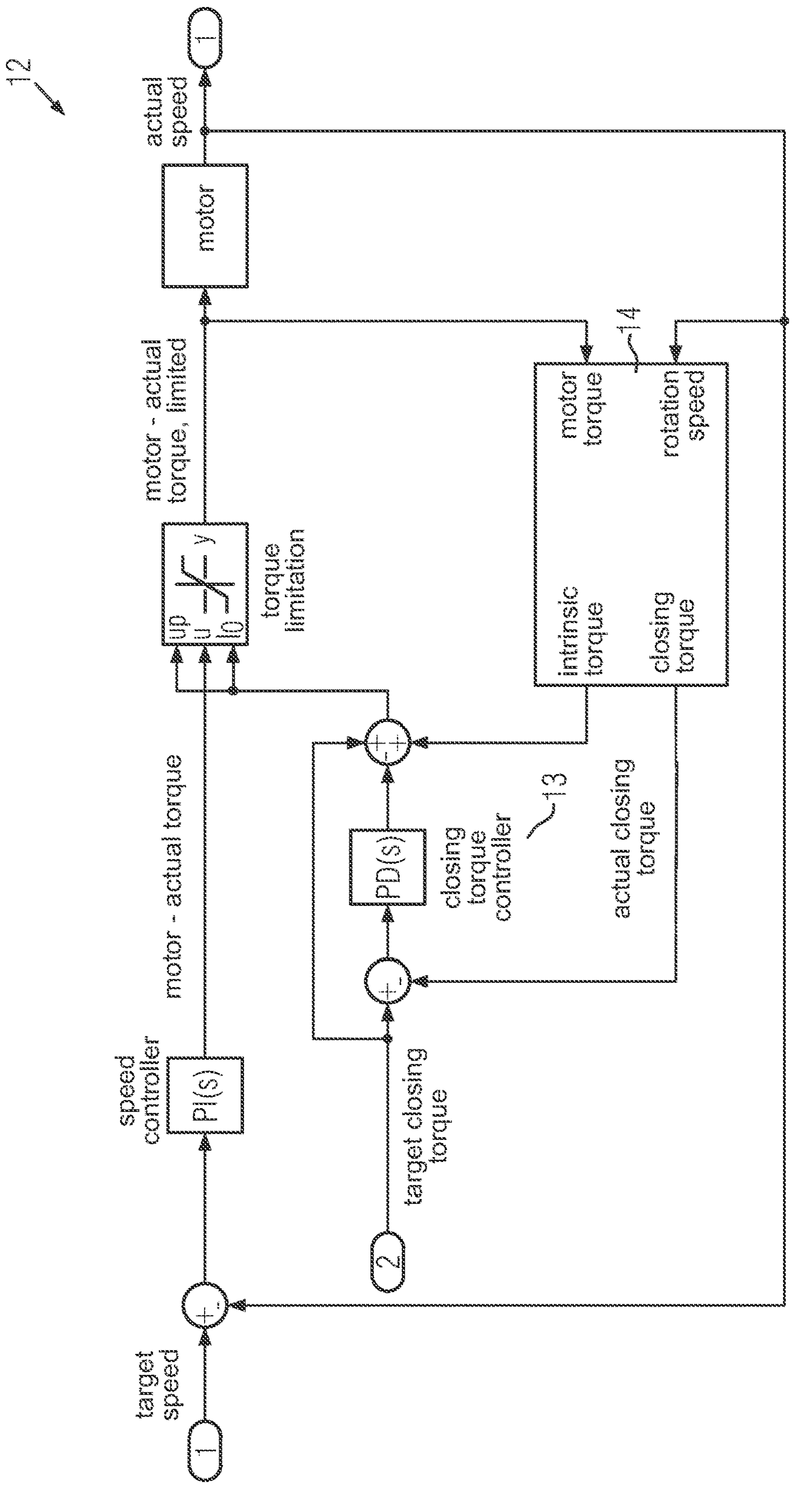
FIG. 2 shows a control loop according to an embodiment.

An exemplary control loop 12, which can be used for the above-described method and/or in the above-described capping device for dynamically adapting the operation of the motor, is shown in FIG. 2. The control loop includes in particular a closing torque controller 13. The controlled variable is here the closing torque, the input variables for the closing torque controller being the target closing torque and the actual closing torque.

The control loop comprises, in addition to the closing torque controller, a section 14, which, making use of an actual closing torque model, determines the actual closing torque from the actual speed of the motor and the (limited) motor torque and outputs it to the closing torque controller. The section executes here, exemplarily, also a modelling of the intrinsic torque of the power train.

It goes without saying that, generally, the features mentioned in the above-described embodiments are not limited to these special combinations and may also be used in any other combination.

The invention claimed is:

1. A capping device for closing a screw cap, comprising a motor, a control unit, and a power train and configured for transmitting force from the motor to the screw cap by means of the power train for a purpose of closing the screw cap, wherein the control unit dynamically adapts operation of the motor to close the screw cap, making use of a measured actual value of an operating parameter of the motor, a target closing torque and an actual closing torque model, wherein the actual closing torque model provides, based on a modelled torque acting on the screw cap, a modelled actual closing torque resulting from this modelled torque while closing the screw cap, wherein the control unit is configured for dynamically adapting the motor operation, based on a control loop, wherein the control loop is configured for outputting for the operating parameter to be set a value and/or a range of values and/or an upper and/or lower limit for the value, based on the measured actual value of the operating parameter and a predetermined target closing torque as input variables, and wherein the control loop is configured to determine a current value of the actual closing torque making use of the actual closing torque model, and to determine, based on a comparison between the current value of the actual closing torque and the value of the target closing torque, the value and/or the range of values and/or the upper and/or lower limit for the operating parameter to be set.

2. The capping device according to claim 1, wherein the actual closing torque model provides the torque acting on the screw cap, making use of a power train model, the power train model comprising in particular a modelled intrinsic torque of the power train.

3. The capping device according to claim 2, wherein the power train model provides a value for the intrinsic torque of the power train, depending on inertia and/or friction in the power train.

4. The capping device according to claim 1, wherein the control loop is configured to determine the value and/or the range of values and/or the upper and/or lower limit for the operating parameter to be set, in such a way that, according to the actual closing torque model, an approach of the value of the actual closing torque to the value of the target closing torque can be expected, when setting the value of the operating parameter to be set.

5. The capping device according to claim 1, wherein the control unit is configured to set at the motor a value, which corresponds to an outputted value and/or lies within an outputted range of values and/or is below an outputted upper limit and/or is above an outputted lower limit.

6. The capping device according to claim 1, wherein the operating parameter to be set comprises a motor speed and/or a motor torque.

7. The capping device according to claim 1, wherein the device is configured for determining a counter-torque, which is caused by the screw cap, by means of the actual closing torque model and by making use of a, or of a set value of the operating parameter, of an expected actual value of the operating parameter and of a measured value of the operating parameter.

8. A method for closing a screw cap, the method comprising:

transmitting a force from a motor to the screw cap by means of a power train for a purpose of closing the screw cap, dynamically adapting operation of the motor to close the screw cap making use of a measured actual value of an operating parameter of the motor, a target closing torque as well as an actual closing torque model, wherein the actual closing torque model provides, based on a modelled torque acting on the screw cap, a modelled actual closing torque resulting from this modelled torque while closing the screw cap, dynamically adapting the operation of the motor on a basis of a control loop, the control loop outputting, based on the measured actual value of the operating parameter and on a predetermined target closing torque as input variables, at least for one motor operating parameter to be set, a value and/or a range of values and/or an upper and/or lower limit for the value, and the control loop determining a current value of the actual closing torque making use of the actual closing torque model, and for determining, based on a comparison between the current value of the actual closing torque and the target closing torque, the value and/or the range of values and/or the upper and/or lower limit for the at least one operating parameter to be set.

9. The method according to claim 8, further comprising:

the control loop determining the value and/or the range of values and/or the upper and/or lower limit for the operating parameter to be set, in such a way that, according to the actual closing torque model, an approach of the value of the actual closing torque to the target closing torque can be expected, when setting the value of the operating parameter to be set.

10. The method according to claim 9, further comprising:

using a control unit to set a value at the motor, which corresponds to the outputted value and/or lies within the outputted range of values and/or is below the outputted upper limit and/or is above the outputted lower limit.

11. A capping device for closing a screw cap, comprising a motor, a control unit, and a power train and configured for transmitting force from the motor to the screw cap by means of the power train for a purpose of closing the screw cap, wherein the control unit dynamically and continuously adapts operation of the motor to close the screw cap, making use of a measured actual value of an operating parameter of the motor, a target closing torque and an actual closing torque model, wherein the actual closing torque model continuously provides, based on a modelled torque acting on the screw cap, a modelled actual closing torque resulting from this modelled torque, wherein the control unit is configured for dynamically and continuously adapting the motor operation, based on a control loop, wherein the control loop is configured for outputting for the operating parameter to be set a value and/or a range of values and/or an upper and/or lower limit for the value, based on the measured actual value of the operating parameter and a predetermined target closing torque as input variables, and wherein the control loop is configured to determine a current value of the actual closing torque making use of the actual closing torque model, and to determine, based on a comparison between the current value of the actual closing torque and the value of the target closing torque, the value and/or the range of values and/or the upper and/or lower limit for the operating parameter to be set.

* * * * *